UNITED STATES PATENT OFFICE.

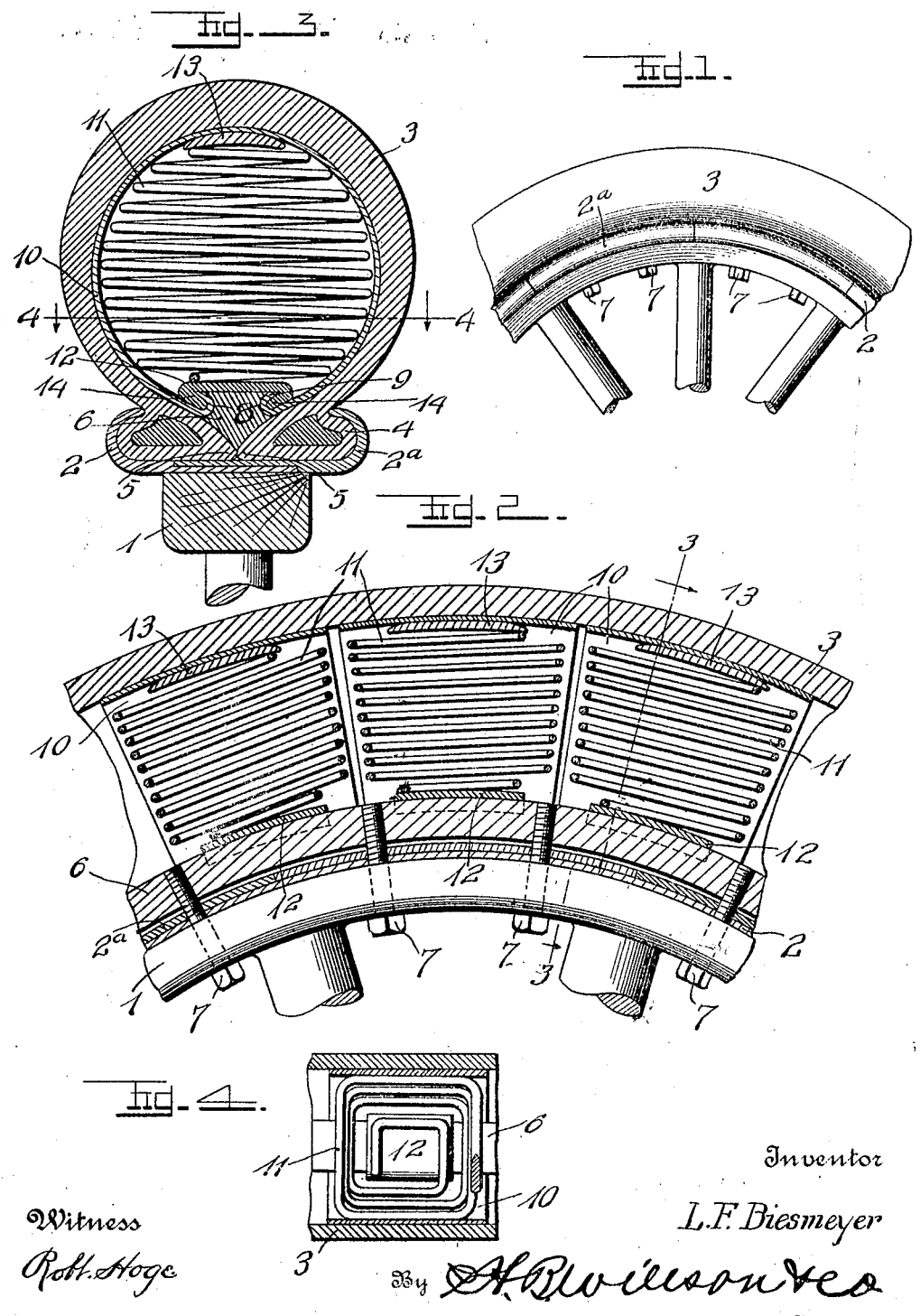

LORENZ F. BIESMEYER, OF CHAMOIS, MISSOURI.

AUTOMOBILE-TIRE.

1,261,684.　　　　　Specification of Letters Patent.　　Patented Apr. 2, 1918.

Application filed October 29, 1917. Serial No. 199,113.

*To all whom it may concern:*

Be it known that I, LORENZ F. BIESMEYER, a citizen of the United States, residing at Chamois, in the county of Osage and State of Missouri, have invented certain new and useful Improvements in Automobile-Tires; and I do declare the following to be a full, clear, and exact description of the invention, such as will enable others skilled in the art to which it appertains to make and use the same.

My invention relates to improvements in tires for automobiles, motorcycles, and numerous other kinds of vehicles, and the object is to provide a simply constructed and inexpensive tire embodying all of the advantages of the pneumatic tire without the disadvantages thereof, a plurality of coiled springs being substituted for the usual air cushion or inner tube.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation of the improved tire applied to a rim formed in sections;

Fig. 2 is a vertical section in the plane of rotation;

Fig. 3 is a transverse section on the plane of line 3—3 of Fig. 2; and

Fig. 4 is a sectional view on the plane indicated by the line 4—4 of Fig. 3.

In the drawings above briefly described, the numeral 1 designates the felly of an automobile wheel, said felly having a rim 2 equipped with detachable sections 2ª, said rim being surrounded by a tire casing or shoe 3 having the usual rim engaging beads 4 whose inner edges 5 preferably though not necessarily abut as shown in Fig. 3.

A casing clamping ring 6 of any preferred material, is positioned within the casing 3 and rests upon the inner edges 5 of the beads 4, said ring being of substantially V shape in transverse section in order that it may properly engage the beads. Screws 7 are passed outwardly through the rim sections 2ª and the felly and are threaded into the clamping ring 6 so that when these screws are tightened, the casing 3 is effectively clamped to the rim so as to prevent creeping.

The opposite side edges of the ring 6 are formed with circumferentially extending grooves or channels 8, and the inwardly turned ends 9 of flat arched springs 10, are received in said channels with said ends spaced from the body portions of the springs. The springs 10 snugly engage the inner side of the casing 3 and necessarily decrease in width toward their ends, but in order to prevent weakening by this reduced width, the springs are increased in thickness toward their ends as seen in Fig. 3. Radially positioned coiled springs 11 are interposed between the outer portions of the springs 10 and the clamping ring 6, each of said springs 11 having an inner shoe 12 bearing on the ring 6, and an outer shoe 13 engaging the peripheral portion of the spring 10. The shoes 12 are preferably in the form of relatively flat plates, and the side edges of said plates are provided with inwardly projecting flanges 14 which straddle the ring 6 and are received snugly between the body portions of the springs 10 and the inwardly turned ends 9 of said springs.

By the arrangement of parts just described, it will be obvious that the springs 11 will retain the shoes 12 in contact with the ring 6 and that the flanges 14 of said shoes will retain the ends of the springs 10 in the channels 8, as said springs are forced to yield when the tire is in use. A tire is thus provided which is highly efficient and durable, yet does not possess the disadvantages of the pneumatic tire, although embodying substantially all of the advantages of such tires.

In transverse section, the springs 11 are substantially rectangular as seen in Fig. 4, and said springs taper inwardly for close relation with each other as shown in Fig. 2. Also (see Fig. 3) the springs 11 conform to the shape of the springs 10.

Since probably the best results are obtained from the several specific details shown and described, these details are by preference employed, but I wish it understood that within the scope of the invention as claimed, numerous minor changes may well be made.

I claim:—

The combination with a tire casing of a ring seated on the inner edges of the casing beads for clamping them against the rim on which the casing is used, said ring having circumferentially extending channels at its opposite sides, arched metal springs positioned transversely in said casing and having their ends turned inwardly substantially upon themselves and seated in said channels, radially positioned coiled springs having inner and outer shoes bearing respectively on said ring and against said arched springs, and circumferentially extending flanges on the side edges of the inner shoes straddling said ring and seated between the inwardly turned ends of said arched springs and the body portions thereof.

In testimony whereof I have hereunto set my hand in the presence of two subscribing witnesses.

LORENZ F. BIESMEYER.

Witnesses:
P. J. PAULSMEYER,
HENRY E. BECKMANN.